I. D. PERRY.
LOCKING DEVICE FOR AUTOMOBILES.
APPLICATION FILED DEC. 7, 1916.
1,215,323.
Patented Feb. 6, 1917.
Fig. 1.
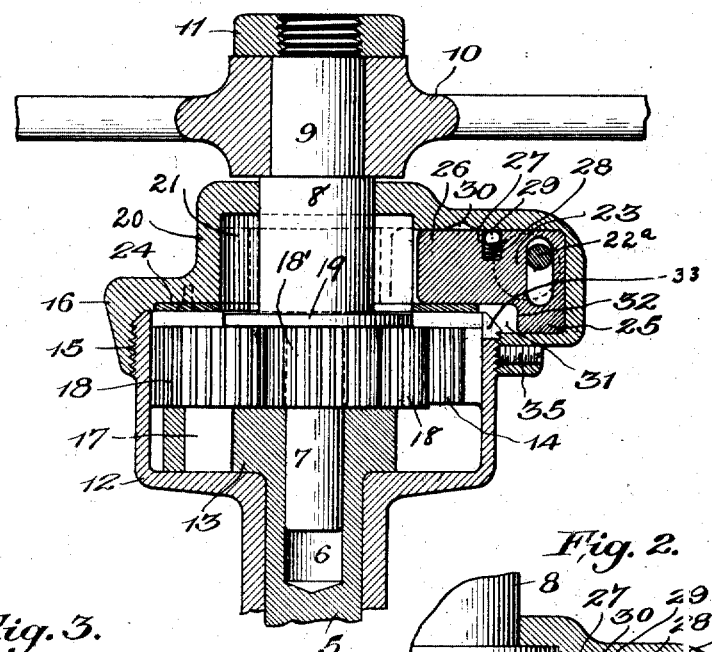
Fig. 2.
Fig. 3.
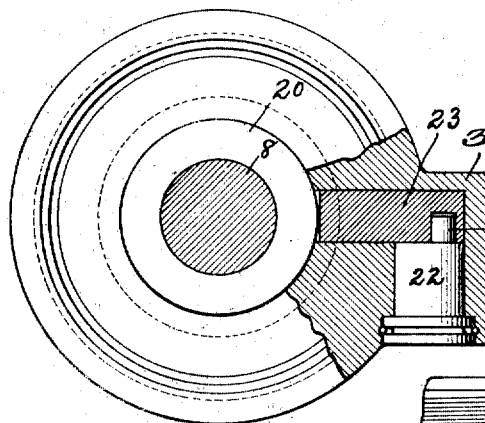
Fig. 4.
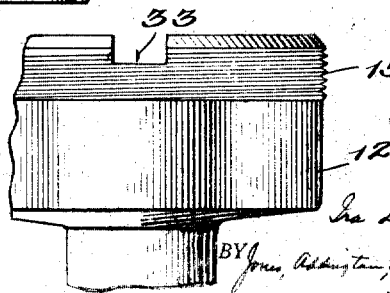
INVENTOR
Ira D. Perry
BY Jones, Addington, Ames & Seibold
ATTORNEYS.

UNITED STATES PATENT OFFICE.

IRA D. PERRY, OF CHICAGO, ILLINOIS.

LOCKING DEVICE FOR AUTOMOBILES.

1,215,323.  Specification of Letters Patent.  Patented Feb. 6, 1917.

Application filed December 7, 1916. Serial No. 135,610.

*To all whom it may concern:*

Be it known that I, IRA D. PERRY, a citizen of the United States, residing at Chicago, in the county of Cook and State of Illinois, have invented new and useful Improvements in Locking Devices for Automobiles, of which the following is a full, clear, concise, and exact description, reference being had to the accompanying drawing, forming a part of this specification.

My invention relates to improvements in locking devices for automobiles, having special reference to means for locking the steering wheel in either operative or inoperative position, and also simultaneously locking the cap of the gear casing to said casing.

A further object is the production of a device of few operative parts that can be readily applied to cars now in use.

A further object is the production of a device that is applicable to cars of the Ford type using planetary gear.

A further object is the production of a device that can be cheaply constructed and one not liable to get out of order or to disarrangement of its parts.

Figure 1 represents a vertical sectional view of my device with the pinions engaged and the wheel locked in steering position.

Fig. 2 represents a fragmentary view of a portion of Fig. 1 with the pinions in demeshed position.

Fig. 3 represents a bottom plan and sectional view of the cap removed from the housing.

Fig. 4 represents a fragmentary view of the housing showing a portion of the cap locking mechanism.

Like numerals of reference indicate like parts in the several figures of the drawings.

Referring now to the drawings, 5 represents the steering column of an automobile, the top of which is provided with a cylindrical recess 6, within which is mounted the reduced end 7 of a stud shaft 8. The stud shaft is reduced at 9 and the ordinary steering wheel 10 fitted thereon and held in place by means of the screw cap 11. Secured on the top of the steering column is a cylindrical housing 12, held against upward movement by the shoulders 13 of the steering column. The upper portion of the interior periphery of the housing is formed with an internal toothed rack 14 and the outer periphery is threaded at 15 to permit the screw cap 16 to be screwed in place, protecting the interior of the housing. Mounted on the usual pins 17 within the housing are a plurality of pinions 18 meshing with the rack 14 on the interior periphery of the housing and also meshing with a pinion 18' rigidly secured on the stud shaft 8. This stud shaft is provided with a peripheral flange or collar 19 extending beyond the circumference of the pinion 18'. The cap 16 is provided with an upwardly-extending portion 20 having an interior space 21 of sufficient diameter to permit the passage of the flange 19 when the stud shaft is moved upwardly.

Mounted within the cap is a lock 22, the usual bolt-engaging arm 22ª of which engages the bolt 23. Secured within the end face of the cap and beneath the bolt 23 is a ring or washer 24 serving to strengthen the cap and serving as a support for the bolt 23. The bolt 23 is L-shaped having a lower projecting portion 25 and a main bolt portion 26. In the upper face of the bolt 23 is a recess 27 within which is mounted a spring 28 and a binding ball or pin 29 and in the end face of the cap a recess 30 is provided in line with the recess in the bolt, so when the bolt is moved forward as shown in Fig. 2 the spring forces the ball or pin into the recess within the cap, thus holding the bolt in place and preventing it from being rattled by the vibration of the machine. It is, of course, understood that the spring is not a very stiff one, so that while it offers sufficient resistance against the retraction of the bolt by the vibration of the machine, it does not prevent any backward and forward movement of the bolt by key operative means.

A slot is cut in the internal periphery of the cap at 31 opposite the face 32 of the shoulder 25 to permit the movement of the shoulder when the bolt is operated. A corresponding slot 33 is cut in the upper edge of the housing adapted to register with the opening 31 in the cap so that when the bolt is moved into place locking the stud shaft in meshed or demeshed position, the shoulder passes through the slots 31, 33, thus positively locking the cap on the housing and preventing its movement in either direction until the bolt is withdrawn. While I have shown the bolt 23 with the main portion and the shoulder 25 integral, it is evident that they may be formed of two separate parts if desired provided they are caused to operate simultaneously.

In assembling the parts in my device, the cap containing the lock mechanism is screwed tightly onto the housing and then the position of the lock bolt 23 is marked on the side of the housing below the enlarged portion 34 containing the lock and bolt. The cap is then unscrewed and the slot 33 formed in the housing. By this method a tight fit is always assured and something of this character is necessary as the relative position of the threads on the housing as compared to the corresponding threaded interior of the cap is never exactly the same, so if the slot in the housing was made without the cap having first been screwed tightly on, it is clear that there would never be an accurate adjustment. By this means, however, the parts are tightly fitted together and all danger of displacement by reason of the vibration prevented.

It is understood, of course, that the cap can be made and sold separate from the balance of the device, as the planetary gearing, stud shaft and wheel are of the ordinary type in use on certain makes of cars, but used in combination with an ordinary covering cap. In order to equip the cars with my improved device, it is simply necessary to remove the nut at the top of the steering wheel, lift the wheel from the tip of the steering column, take off the ordinary cap and having seen to it that the lock is in unlocked position, to screw in place my improved cap. The marks on the housing are then made in order to be sure that the locking device will occupy the proper position when finally assembled. The locking cap is then removed and the slot filed as heretofore described and then the improved cap put back in place. When the cap is in proper position, the set screw 35 is screwed into place, assisting in holding the members together in proper relation to each other.

Owing to the increasing demand for automobiles, thefts of cars left standing are frequent and a device such as mine is of great value in preventing the theft of a car as when the car is out of use the lock is drawn back, the wheel raised, and the lock shot back into place, thus leaving the wheel free to spin like a top in this position and when the wheel is thus spinning the car cannot be steered, thus making it impossible for any one to run the car off on its own power.

Having thus described my invention, what I claim as new and desire to secure by Letters Patent is:

1. In a locking device for automobiles the combination of a steering head comprising a planetary gearing, a stud shaft on which the center pinion of said gearing is mounted, said stud shaft being movable from a position in which the center pinion is enmeshed to a position in which it is out of mesh, a housing containing said gearing, a cap for said housing, and a unitary device having means for locking the cap on the housing and also means for locking the stud shaft in either meshed or demeshed position.

2. In a locking device for automobiles the combination of a steering head comprising a planetary gearing, a stud shaft on which the center pinion of said gearing is mounted, said stud shaft being movable from a position in which the center pinion is enmeshed to a position in which it is out of mesh, a housing containing said gearing, a cap for said housing, and a locking bolt having a part for locking the cap on the housing and also a part for locking the stud shaft in either meshed or demeshed position.

3. In a locking device for automobiles the combination of a steering head comprising a planetary gearing, a stud shaft on which the center pinion of said gearing is mounted, said stud shaft being movable from a position in which the center pinion is enmeshed to a position in which it is out of mesh, a housing containing said gearing, a cap for said housing, and a shouldered locking bolt having a part for locking the cap on the housing and also a part for locking the stud shaft in either meshed or demeshed position.

4. In a locking device for automobiles the combination of a steering head comprising a planetary gearing, a stud shaft on which the center pinion of said gearing is mounted, a slotted housing containing said gearing, a cap for said housing, and a shouldered locking bolt for locking the cap on the housing, and the stud shaft whether the stud shaft is in meshed or demeshed 11 position, the shoulder of said bolt being adapted to fit within the slot in said housing when the bolt is moved into locking position.

5. In a locking device for automobiles 1 the combination of a steering head comprising a planetary gearing, a stud shaft on which the center pinion of said gearing is mounted, a slotted housing containing said gearing, a slotted cap for said housing the slot in said cap being adapted to register with the slot in the housing when the parts are assembled, and a shouldered locking bolt for locking the cap on the housing, and the stud shaft whether the stud shaft is in meshed or demeshed position, the shoulder of said bolt being adapted to fit within the slot in said housing when the bolt is moved into locking position.

In witness whereof, I have hereunto subscribed my name in the presence of two witnesses.

IRA D. PERRY.

Witnesses:
F. E. JOHNSON,
EDITH ANDERSON.